(12) United States Patent  (10) Patent No.: US 8,768,096 B2
Pekkucuksen et al.  (45) Date of Patent: Jul. 1, 2014

(54) METHOD AND APPARATUS FOR STEREO MISALIGNMENT ESTIMATION USING MODIFIED AFFINE OR PERSPECTIVE MODEL

(75) Inventors: Ibrahim Ethem Pekkucuksen, Dallas, TX (US); Wei Hong, Allen, TX (US); Aziz Umit Batur, Dallas, TX (US); Buyue Zhang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 398 days.

(21) Appl. No.: 13/298,936

(22) Filed: Nov. 17, 2011

(65) Prior Publication Data

US 2012/0128236 A1 May 24, 2012

Related U.S. Application Data

(60) Provisional application No. 61/414,957, filed on Nov. 18, 2010.

(51) Int. Cl.
*G06K 9/36* (2006.01)
*G06K 9/32* (2006.01)

(52) U.S. Cl.
USPC ........... 382/276; 382/287; 382/293; 382/294; 382/295; 382/296

(58) Field of Classification Search
USPC .......... 382/276, 287, 293, 294, 295, 296, 297
See application file for complete search history.

(56) References Cited

U.S. PATENT DOCUMENTS

| | | | |
|---|---|---|---|
| 7,085,401 B2 * | 8/2006 | Averbuch et al. | 382/103 |
| 8,134,603 B2 * | 3/2012 | Auberger et al. | 348/208.3 |
| 2003/0081836 A1 * | 5/2003 | Averbuch et al. | 382/199 |

* cited by examiner

*Primary Examiner* — Brian Le
(74) *Attorney, Agent, or Firm* — Mima Abyad; Frederick J Telecky, Jr.

(57) ABSTRACT

A method and apparatus for estimating stereo misalignment using modified affine or perspective model. The method includes dividing a left frame and a right frame into blocks, comparing horizontal and vertical boundary signals in the left frame and the right frame, estimating the horizontal and the vertical motion vector for each block in a reference frame, selecting a reliable motion vectors from a set of motion vectors, dividing the selected block into smaller features, feeding the data to an affine or a perspective transformation model to solve for the model parameters, running the model parameters through a temporal filter, portioning the estimated misalignment parameters between the left frame and right frame, and modifying the left frame and the right frame to save some boundary space.

30 Claims, 3 Drawing Sheets

METHOD AND APPARATUS FOR STEREO MISALIGNMENT ESTIMATION USING MODIFIED AFFINE OR PERSPECTIVE MODEL

CROSS-REFERENCE TO RELATED APPLICATIONS

This application claims benefit of U.S. provisional patent application Ser. No. 61/414,957, filed Nov. 18, 2010, which is herein incorporated by reference.

BACKGROUND OF THE INVENTION

1. Field of the Invention

Embodiments of the present invention generally relate to a method and apparatus for stereo misalignment estimation, and more specifically, for stereo misalignment estimation using modified affine or perspective model.

2. Description of the Related Art

Cameras in a stereo system are usually slightly misaligned due to manufacturing imperfection, environmental factors, and the like. Currently, solutions use hardware to resolve such misalignment. However, hardware calibration is expensive and usually unavailable.

Therefore, there is a need for a method and/or apparatus for improving the camera systems to estimate stereo misalignment.

SUMMARY OF THE INVENTION

Embodiments of the present invention relate to a method and apparatus for estimating stereo misalignment using modified affine or perspective model. The method includes dividing a left frame and a right frame into blocks, comparing horizontal and vertical boundary signals in the left frame and the right frame, estimating the horizontal and the vertical motion vector for each block in a reference frame, selecting a reliable motion vectors from a set of motion vectors, dividing the selected block into smaller features, feeding the data to an affine or perspective transformation model to solve for the model parameters, running the model parameters through a temporal filter, portioning the estimated misalignment parameters between the left frame and right frame, and modifying the left frame and the right frame to save some boundary space.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
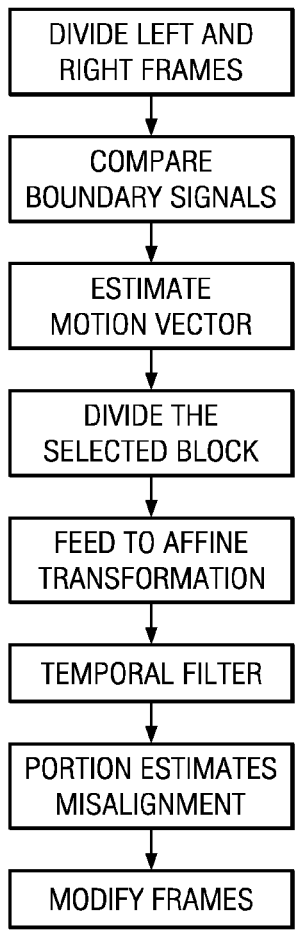
FIG. 1 is an embodiment of a flow diagram for a method for estimating stereo misalignment using modified affine or perspective model.

FIG. 1 is an embodiment of a flow diagram for a method for estimating stereo misalignment using a modified affine or perspective model. FIG. 1, the method divides a left frame and a right frame into blocks. Then, the method compares horizontal and vertical boundary signals in the left frame and the right frame and estimates the horizontal and the vertical motion vector for each block in a reference frame. As shown in FIG. 1, the method selects a reliable motion vectors from a set of motion vectors, divides the selected block into smaller features, and feeds the data to an affine or perspective transformation model to solve for the model parameters. Finally, the method runs the model parameters through a temporal filter, portions the estimated misalignment parameters between the left frame and right frame, and modifies the left frame and the right frame to save some boundary space. In one embodiment, the method does not perform hardware calibration; rather, charts are utilized to perform software calibration. Thus, no special charts are needed to calibrate a frame.

The motion between the left and right frames produced by the stereo camera setup is estimated. The estimated motion vectors are used to model the relationship between the left and right frames in terms of vertical translation, rotation, and scaling in the case of affine transformation and in terms of two additional parameters in the case of perspective transformation.

The left and right frames are divided into several blocks. For each block, horizontal and vertical boundary signals are calculated. A horizontal boundary signal is a row vector that consists of the sum of pixel columns in the block. Similarly, a vertical boundary signal is a column vector for which each element is the sum of all pixels in its row. In one embodiment, one dimensional horizontal and vertical motion estimation are carried out by comparing these horizontal and vertical boundary signals in left and right frames. As a result, a horizontal and a vertical motion vector are estimated for each block in the reference frame.

Next, the reliable motion vectors are selected from the available motion vectors. In one embodiment, only the vertical motion components are considered. When the absolute value is equal to the maximum search range, the motion vector is determined to be unreliable and, thus, its block is eliminated. If there are more than a predetermined number of blocks left after this check, the motion vectors may optionally be sorted and the minimum and maximum ones may be eliminated.

Selected block is then divided into smaller blocks or features. In one embodiment, to minimize the computational complexity, a subset of the features is used to refine the initial motion vector estimates. The features are selected based on a combination of several criteria, such as, the contrast with their surroundings and their distance to the center of the frame. For the selected features, two dimensional block based motion estimation are carried out on a small range to increase the accuracy of the initial motion vectors. The computational complexity is decreased by employing a two stage hierarchical motion estimation scheme.

After completing this step, several features with their corresponding motion vectors and coordinates in the reference frame remain. Such data is fed to an affine or a perspective transformation model to solve for the model parameters. The classic affine transformation model is given as follows:

$$\begin{bmatrix} x' \\ y' \end{bmatrix} = \begin{bmatrix} 1+c & -s \\ s & 1+c \end{bmatrix} \begin{bmatrix} x \\ y \end{bmatrix} + \begin{bmatrix} d_x \\ d_y \end{bmatrix},$$

where $d_x$ is the horizontal translation parameter, $d_y$ is the vertical translation parameter, is the rotation parameter, and c is the scaling parameter. However, in such embodiments, the horizontal disparity that is present between left and right frames is not taken into account. Disparity is a function of depth and accurate depth estimation can be costly.

Using homogenous coordinates, a perspective transformation can be written as follows:

$$\begin{bmatrix} X \\ Y \\ Z \end{bmatrix} = \begin{bmatrix} 1+c & -s & d_x \\ s & 1+c & d_y \\ g & h & 1 \end{bmatrix} \begin{bmatrix} x \\ y \\ 1 \end{bmatrix}$$

where g and h are the additional parameters that enable perspective warp. Cartesian coordinates can be calculated by x'=X/Z and y'=Y/Z.

Figure 2:
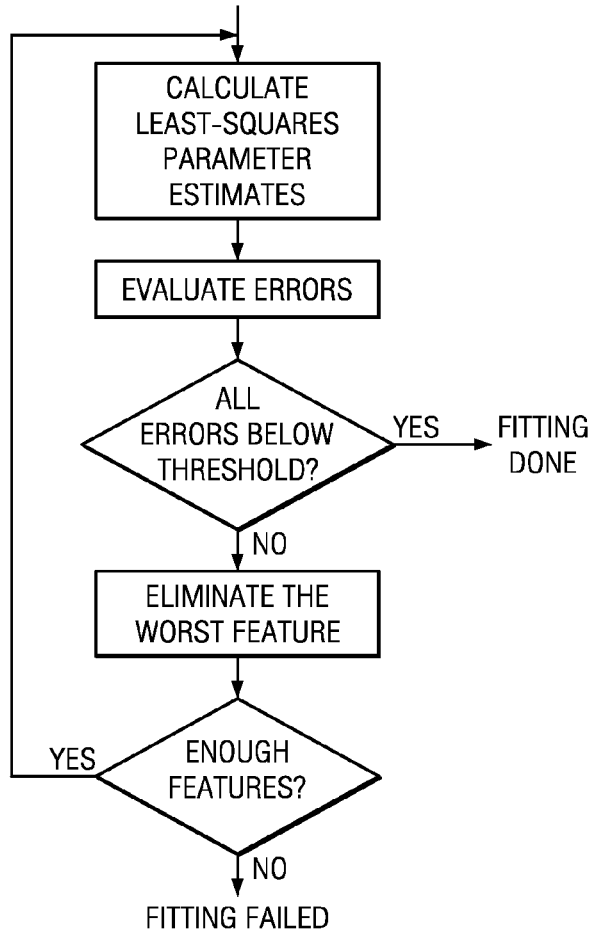
FIG. 2 is an embodiment of a flow diagram for a method for performing affine or perspective model fitting.

FIG. 2 is an embodiment of a flow diagram for a method for performing affine or perspective model fitting. In FIG. 2, the model fitting stage can be summarized. As shown in FIG. 2, the model fitting stage starts by calculating the least-squares parameter estimates and evaluating the error. If the error is found to be below a threshold, the fitting ends. Otherwise, the worst feature is eliminated. After elimination, if there are enough features, the least-squares parameter estimates are calculated again; otherwise, the fitting ends. In some embodiment, the horizontal component is not taken into account. For affine transformation this leads to the following model with three parameters:

$$[y'] = [s \quad 1+c] \begin{bmatrix} x \\ y \end{bmatrix} + [d_y]$$

For perspective transformation, it leads to the following model with five parameters:

$$\begin{bmatrix} Y \\ Z \end{bmatrix} = \begin{bmatrix} s & 1+c & d_y \\ g & h & 1 \end{bmatrix} \begin{bmatrix} x \\ y \\ 1 \end{bmatrix}$$

To avoid flicker artifacts in the output, in some embodiments, the parameters found for each frame directly may not be used. Instead, the parameters may be run through a temporal filter where E(n) is the parameter estimation from the $n^{th}$ frame, P(n) is set the of parameters used for correcting the $n^{th}$ frame, and P(0)=(0,0,0). Finally, the estimated misalignment parameters are portioned between the left and right frames and both are modified to save some boundary space. The temporal filter is described in FIG. 3.

Figure 3:
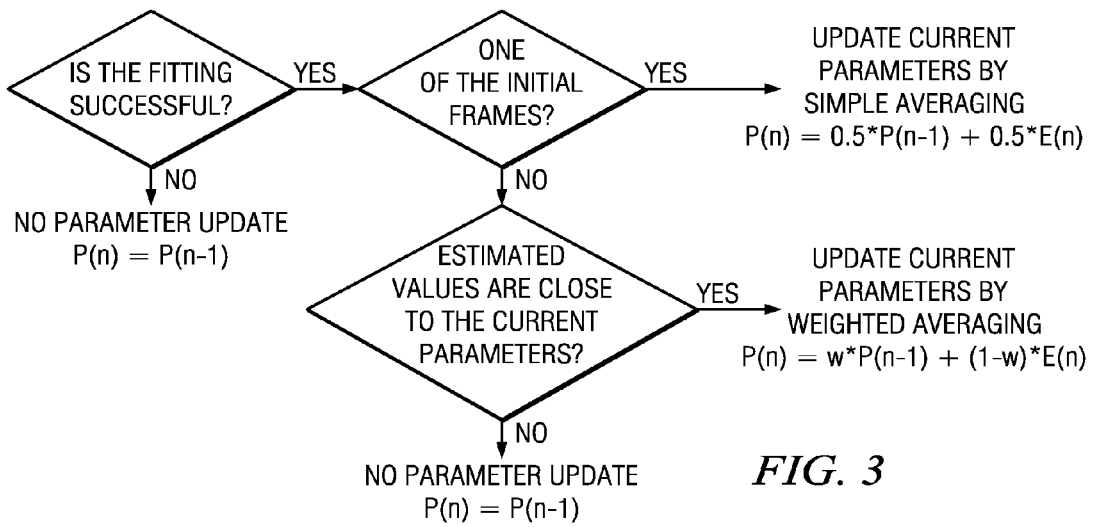
FIG. 3 is an embodiment of a temporal filter.

FIG. 3 is an embodiment of a temporal filter. When the fitting was successful and the frame is an initial frame, the current parameters are updated by averaging, P(n)=0.5*P(n−1)+0.5*E(n). However, when the fitting was successful and the estimated values are close to the current values, then the current parameters are updated by weighted averaging, P(n)= w*P(n−1)+(1−w)*E(n), where w is the weight. Otherwise, the parameters are not updated and P(n)=P(n−1).

Figure 4:
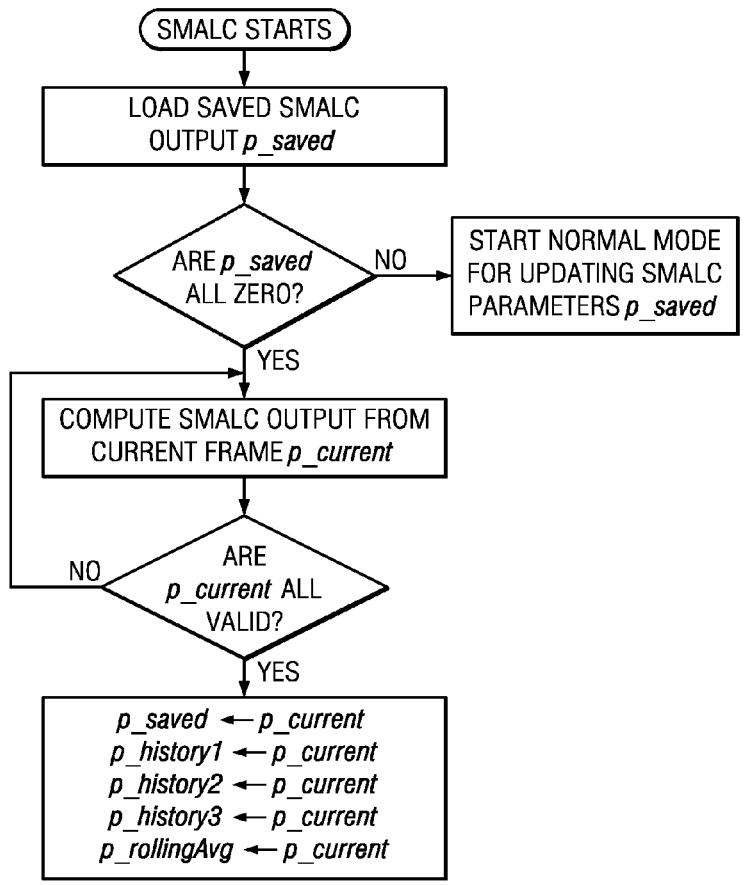
FIG. 4 is an embodiment of a Stereo Misalignment Correction Algorithm initialization stage.

In another embodiment, to improve the reliability of SMALC (Stereo Misalignment Correction Algorithm) output and avoid flicker artifacts, instead of using the instantaneous parameters estimated from each UR frame pairs, SMALC output is updated following a series of rules, as shown in the example in FIG. 4. FIG. 4 is an embodiment of a Stereo Misalignment Correction Algorithm initialization stage (SMALC).

In FIG. 4, SMALC output p_saved are initialized to zeros. At the initial call of the algorithm, the instantaneous SMALC parameters p_current is computed. However, the output p_saved may not be updated. For new frames, p_current is computed until all the SMALC parameters in p_current are valid. At such point, p_saved is directly updated to p_current, as well as the three history buffers, which record the last three valid SMALC instantaneous output, p_histoty1, p_history2, and p_history3. p_rollingAvg. These parameters are computed according to the following equation: p_rollingAvg(n)= (p_history1(n)+p_history1(n)+p_history1(n))/3, (Where, n is the temporal index of the frames), which is also updated to p_current.

At such point, SMALC may start operating in normal mode for updating final output p_saved. To check if p_current is valid, each SMALC estimates parameter is compared with a pre-determined threshold. For example, the valid rotation parameter may be less than ±1 degree and the valid scaling factor to be less than ±3%.

In the normal mode of updating, SMALC computes instantaneous output p_current for each frame. It updates the three history buffers with p_current if p_current is valid. After history buffer is updated, the algorithm checks if the SMALC parameters in the past three valid frames are consistent, by comparing the maximal difference among the three history buffers max{diff_ij} with a pre-determined threshold maxestdif. The difference between each two buffers diff_ij is computed by using the following equation: diff_ij(n)=sum (weight_k*abs(p_history_i(n,k)−p_history_j(n,k))).

In one embodiment, the weight for vertical misalignment is 1.0, for scaling factor is the horizontal resolution dividing by 2, and for rotation factor is the vertical resolution dividing by 2, and maxestdif is the horizontal resolution dividing by 50. If max{diff_ij} is less than maxestdif, the rolling average p_rollingAvg is updated according to the equation p_rollingAvg (n)=(p_history1(n)+p_history1(n)+p_history1(n))/3, and the final output p_saved is updated according to p_saved(n)= α*p_saved(n−1)+(1−α)*p_rollingAvg(n), where, n is temporal index of the frames, and α is updating speed. In one embodiment, α is 0.1, where a can be set to different values for slow updating mode and fast updating mode. The smaller α is, the faster the update speed. It should be noted that k indexes the k-th parameter in each instantaneous SMALC output, n indexes the temporal order of the frames, i,j index the three history buffers, and weight_k is the weight given to the difference between two frame output for the k-th parameter.

Figure 5:
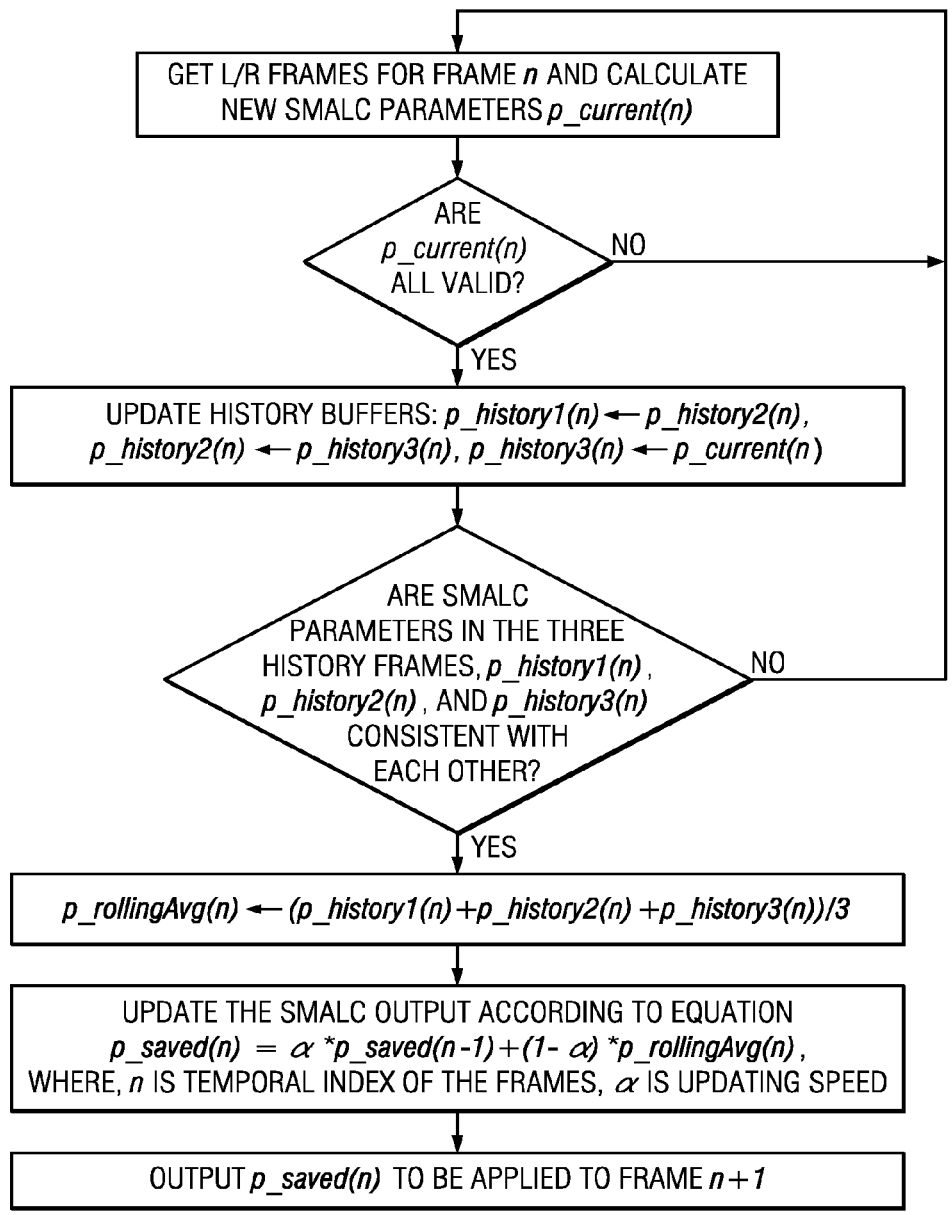
FIG. 5 is an embodiment of a Stereo Misalignment Correction Algorithm normal mode for updating the output.

FIG. 5 is an embodiment of a Stereo Misalignment Correction Algorithm (SMALC) normal mode for updating the output. After initializing SMALC, SMALC runs in normal mode. In normal mode, SMALC current parameters are calculated using the left and right frames. When the current value is valid, the history parameters are updated with the new values. If the history values are updated, the rolling average value is calculated using the following equation:

$$p\_rollingAvg(n) \leftarrow (p\_history1(n)+p\_history2(n)+p\_history3(n))/3$$

and the SMALC output is updated to be used in the next frame using the following equation:

$$p\_saved(n)=\alpha*p\_saved(n-1)+(1-\alpha)*p\_rollingAvg(n).$$

Such an embodiment uses a three parameter affine transformation model that generates vertical translation, rotation, and scaling parameters or a five parameter perspective model that generates two more parameters in addition to the three affine parameters. Since our model does not rely on the horizontal motion vectors, such a solution does not suffer from the uncertainty of the horizontal disparity present in most stereo image pair. Furthermore, since the initial motion estimation for each direction is carried out separately using boundary signals and since the hierarchical motion estimation is used to refine initial motion vectors, such a solution has low computational complexity.

While the foregoing is directed to embodiments of the present invention, other and further embodiments of the invention may be devised without departing from the basic scope thereof, and the scope thereof is determined by the claims that follow.

What is claimed is:

1. A method of a digital processor for estimating stereo misalignment using modified affine or perspective model, comprising:
   dividing a left frame and a right frame into blocks;
   comparing horizontal and vertical boundary signals in the left frame and the right frame;
   estimating the horizontal and the vertical motion vector for each block in a reference frame;
   selecting a reliable motion vectors from a set of motion vectors;
   dividing the selected block into smaller features;
   feeding the data to an affine or a perspective transformation model to solve for the model parameters;
   running the model parameters through a temporal filter;
   portioning the estimated misalignment parameters between the left frame and right frame; and
   modifying the left frame and the right frame to save some boundary space.

2. The method of claim 1, wherein the selecting the reliable motion vectors step only considers vertical vectors.

3. The method of claim 1, wherein a block is eliminated when the absolute value is equal to a maximum search range.

4. The method of claim 3, wherein when there are more than a predetermined number of blocks left, sorting the motion vectors and eliminating the minimum and maximum blocks.

5. The method of claim 1, wherein a subset of the feature is used to refine the initial motion vector estimates.

6. The method of claim 5, wherein the features are selected based on a at least one of the contrast with their surroundings and the distance to the center of the frame.

7. The method of claim 5, wherein a subset of the feature is used to refine the initial motion vector estimates.

8. The method of claim 5, further comprising at least one of, for the selected features, carrying out two dimensional block based motion estimation on a small range and employing a two stage hierarchical motion estimation scheme.

9. The method of claim 1, further comprising feeding the data to an affine or a perspective transformation model to solve for the model parameters.

10. The method of claim 1, wherein the temporal filter updates the current parameters by at least one of:
    running Stereo Misalignment Correction Algorithm in normal mode after Stereo Misalignment Correction Algorithm initialization stage, wherein running in normal mode comprises calculating the current parameters using the left and right frames, when the current value is valid, updating the history parameters with the new values, calculating the rolling average value and updating output, wherein the updated output is used in the next frame and is calculated by $$p\_saved(n)=\alpha*p\_saved(n-1)+(1-\alpha)*p\_rollingAvg(n);$$
or averaging, $P(n)=0.5*P(n-1)+0.5*E(n)$ when the fitting was successful and the frame is an initial frame, when the fitting was successful and the estimated values are close to the current values, then the current parameters are updated by weighted averaging, $P(n)=w*P(n-1)+(1-w)*E(n)$ wherein $E(n)$ is the parameter estimation from the $n^{th}$ frame, $P(n)$ is set the of parameters used for correcting the $n^{th}$ frame, and $P(0)=(0,0,0)$.

11. An apparatus for estimating stereo misalignment using modified affine or perspective model, comprising:
    means for dividing a left frame and a right frame into blocks;
    means for comparing horizontal and vertical boundary signals in the left frame and the right frame;
    means for estimating the horizontal and the vertical motion vector for each block in a reference frame;
    means for selecting a reliable motion vectors from a set of motion vectors;
    means for dividing the selected block into smaller features;
    means for feeding the data to an affine or a perspective transformation model to solve for the model parameters;
    means for running the model parameters through a temporal filter;
    means for portioning the estimated misalignment parameters between the left frame and right frame; and
    means for modifying the left frame and the right frame to save some boundary space.

12. The apparatus of claim 11, wherein the means for selecting the reliable motion vectors only considers vertical vectors.

13. The apparatus of claim 11, wherein the means for eliminating eliminates a block when the absolute value is equal to a maximum search range.

14. The apparatus of claim 13, wherein when there are more than a predetermined number of blocks left, sorting the motion vectors and eliminating the minimum and maximum blocks.

15. The apparatus of claim 11, wherein a subset of the feature is used to refine the initial motion vector estimates.

16. The apparatus of claim 15, wherein the features are selected based on a at least one of the contrast with their surroundings and the distance to the center of the frame.

17. The apparatus of claim 15, wherein a subset of the feature is used to refine the initial motion vector estimates.

18. The apparatus of claim 15, further comprising at least one of, for the selected features, means for carrying out two dimensional block based motion estimation on a small range and means for employing a two stage hierarchical motion estimation scheme.

19. The apparatus of claim 11, further comprising means for feeding the data to an affine or a perspective transformation model to solve for the model parameters.

20. The apparatus of claim 11, wherein the temporal filter updates the current parameters by at least one of:
    means for running Stereo Misalignment Correction Algorithm in normal mode after Stereo Misalignment Correction Algorithm initialization stage, wherein normal mode comprises means for calculating the current parameters using the left and right frames, means for updating the history parameters with the new values, means for calculating the rolling average value and means for updating output, wherein the updated output is used in the next frame and is calculated by $$p\_saved(n) = \alpha * p\_saved(n-1) + (1-\alpha) * p\_rollingAvg(n);$$
or means for averaging, P(n)=0.5*P(n−1)+0.5*E(n) when the fitting was successful and the frame is an initial frame, when the fitting was successful and the estimated values are close to the current values, then the current parameters are updated by weighted averaging, P(n)=w*P(n−1)+(1−w)*E(n) wherein E(n) is the parameter estimation from the $n^{th}$ frame, P(n) is set the of parameters used for correcting the $n^{th}$ frame, and P(0)=(0,0,0).

21. A non-transitory storage medium with executable computer instruction, when executed, performs an instruction for estimating stereo misalignment using modified affine or perspective model, the method comprising:
dividing a left frame and a right frame into blocks;
comparing horizontal and vertical boundary signals in the left frame and the right frame;
estimating the horizontal and the vertical motion vector for each block in a reference frame;
selecting a reliable motion vectors from a set of motion vectors;
dividing the selected block into smaller features;
feeding the data to an affine or a perspective transformation model to solve for the model parameters;
running the model parameters through a temporal filter;
portioning the estimated misalignment parameters between the left frame and right frame; and
modifying the left frame and the right frame to save some boundary space.

22. The non-transitory storage medium of claim 21, wherein the selecting the reliable motion vectors step only considers vertical vectors.

23. The non-transitory storage medium of claim 21, wherein a block is eliminated when the absolute value is equal to a maximum search range.

24. The non-transitory storage medium of claim 23, wherein when there are more than a predetermined number of blocks left, sorting the motion vectors and eliminating the minimum and maximum blocks.

25. The non-transitory storage medium of claim 21, wherein a subset of the feature is used to refine the initial motion vector estimates.

26. The non-transitory storage medium of claim 25, wherein the features are selected based on a at least one of the contrast with their surroundings and the distance to the center of the frame.

27. The non-transitory storage medium of claim 25, wherein a subset of the feature is used to refine the initial motion vector estimates.

28. The non-transitory storage medium of claim 25, further comprising at least one of, for the selected features, carrying out two dimensional block based motion estimation on a small range and employing a two stage hierarchical motion estimation scheme.

29. The non-transitory storage medium of claim 21, further comprising feeding the data to an affine or a perspective transformation model to solve for the model parameters.

30. The non-transitory storage medium of claim 21, wherein the temporal filter updates the current parameters by at least one of:
running Stereo Misalignment Correction Algorithm in normal mode after Stereo Misalignment Correction Algorithm initialization stage, wherein running in normal mode comprises calculating the current parameters using the left and right frames, when the current value is valid, updating the history parameters with the new values, calculating the rolling average value and updating output, wherein the updated output is used in the next frame and is calculated by $$p\_saved(n) = \alpha * p\_saved(n-1) + (1-\alpha) * p\_rollingAvg(n);$$
or averaging, P(n)=0.5*P(n−1)+0.5*E(n) when the fitting was successful and the frame is an initial frame, when the fitting was successful and the estimated values are close to the current values, then the current parameters are updated by weighted averaging, P(n)=w*P(n−1)+(1−w)*E(n) wherein E(n) is the parameter estimation from the $n^{th}$ frame, P(n) is set the of parameters used for correcting the $n^{th}$ frame, and P(0)=(0,0,0).

* * * * *